United States Patent [19]
Gomm et al.

[11] Patent Number: 5,650,761
[45] Date of Patent: Jul. 22, 1997

[54] CASH ALTERNATIVE TRANSACTION SYSTEM

[76] Inventors: R. Greg Gomm; R. Gary Gomm, both of 6110 Rittiman Rd., San Antonio, Tex. 78218; Scott Paul, 3002 Oak Sprawl, San Antonio, Tex. 78231

[21] Appl. No.: 423,571

[22] Filed: Apr. 14, 1995

Related U.S. Application Data

[63] Continuation-in-part of Ser. No. 357,683, Dec. 16, 1994, which is a continuation-in-part of Ser. No. 132,467, Oct. 6, 1993, abandoned.

[51] Int. Cl.⁶ ........................................... G06F 7/08
[52] U.S. Cl. ........................ 235/381; 902/22; 235/380
[58] Field of Search .................... 235/381, 380; 902/22

[56] References Cited

U.S. PATENT DOCUMENTS

| | | |
|---|---|---|
| 4,224,666 | 9/1980 | Giraud . |
| 4,256,955 | 3/1981 | Giraud et al. . |
| 4,501,960 | 2/1985 | Jouvet et al. . |
| 4,575,621 | 3/1986 | Dreifus . |
| 4,605,844 | 8/1986 | Haggan . |
| 4,611,205 | 9/1986 | Eglise .................................. 902/22 |
| 4,614,861 | 9/1986 | Pavlov et al. . |
| 4,764,666 | 8/1988 | Bergeron . |
| 4,766,548 | 8/1988 | Cedrone et al. .................... 364/479 |
| 4,797,542 | 1/1989 | Hara . |
| 4,819,204 | 4/1989 | Schrenk . |
| 4,837,422 | 6/1989 | Dethloff et al. . |
| 4,841,133 | 6/1989 | Gercekci et al. . |
| 4,849,615 | 7/1989 | Mollet . |
| 4,864,110 | 9/1989 | Guillou . |
| 4,877,947 | 10/1989 | Mori . |
| 4,910,393 | 3/1990 | Gercekei et al. . |
| 4,962,531 | 10/1990 | Sipman et al. . |
| 4,968,873 | 11/1990 | Dethloff et al. . |
| 4,982,070 | 1/1991 | Bezin et al. . |
| 4,992,646 | 2/1991 | Collin . |
| 5,101,098 | 3/1992 | Naito . |
| 5,149,945 | 9/1992 | Johnson et al. . |
| 5,407,049 | 4/1995 | Jacobs .................................. 194/200 |

*Primary Examiner*—Harold Pitts
*Attorney, Agent, or Firm*—David G. Henry

[57] ABSTRACT

Applicant's invention includes a cash-alternative transaction processing system and associated methods based on the use of coin cards, purchase point coin card reader/writer transaction register systems, and clearing center processors. Also includes are elements relating to use of coin cards in vending machines.

8 Claims, 6 Drawing Sheets

Docking Station Software Flow

CASH ALTERNATIVE TRANSACTION SYSTEM

This is a continuation in part of application Ser. No. 08/357,683 filed on Dec. 16, 1994 which was itself a continuation in part of Ser. No. 08/132,467 filed Oct. 6, 1993 now abandoned.

BACKGROUND OF THE INVENTION

1. Field of the Invention

Applicant's invention relates to electronically encoded "coin cards" and their use as currency substitutes in monetary transactions.

2. Background Information

Small transactions involving monetary exchanges of less than about $2.00 present inconveniences not thus far adequately addressed by the drastic changes to the ways in which Americans carry out their purchasing transactions as brought about by the proliferation of credit cards, checks, ATM cards, etc.

From the purchaser's point of view, there still exists a practical need to carry noisy, weighty, pocket-fraying and easily misplaced coins if one is to effect day-to-day, small-value transactions such as purchases of chewing gum, candy bars, soft drinks, coffee, telephone calls, newspapers, transit tokens, etc. Further, there is a stigma, or at least informal pressure by proprietors, associated with using a credit card or check in such small amount transactions. A purchaser (or would-be purchaser) who lacks a cache of coins tends to either forego such transactions altogether, or to purchase items which he or she would not have otherwise purchased in order to raise the total transaction value to a "respectable" amount.

From vendors' point of view, small value transactions which involve coins (or which, because of the amounts involved, seem most appropriate for coins) present many problems which seem far out of proportion to the value of the transactions. These problems include: (1) time-intensive and error-prone coin counting steps at each transaction and at register closing time; (2) coin management including wrapping coins and transporting coins to banks; (3) the time and paperwork expense associated with customers who actually do use credit cards or checks for <$1.00 transactions; (4) the cumulative effect of numerous customers being "just a few cents short" in their pocket change; (5) loss of sales to customers who neither have adequate pocket change nor are willing to use credit cards or checks for such purchases; and (6) theft—particularly in the case of vending machines.

Even for consumers who do not routinely make small-value transactions as described above and/or who prefer not to carry coins there still exists a substantial inconvenience arising from the present lack of an acceptable coin substitute—getting change back from cash transactions involving any transaction amount other than an even-dollar amount. Unless one is prepared to leave his or her change with the proprietor, all but even-dollar cash transactions will send a consumer from a store with coins in the pocket or purse.

The magnitude of the inconveniences described above can only be appreciated in light of statistics such as the immense volume of coins in circulation in this country. At present, there are some $7.4 billion in coins in circulation according to the U.S. Treasury Department. Further illuminating is the fact that just one of the many coin-intensive facets of our economy—the vending and amusement equipment industry—generated $33 billion dollars in sales in 1991 alone. Adding to this amount the almost incalculable number of coins involved simply in "giving change" in cash transactions begins to demonstrate the collective inconvenience borne by Americans for lack of a substitute for coins, a substitute which is truly acceptable from social, practical, and economic viewpoints.

While some basic building blocks exist for a practical and universal coin substitute system, and while long-felt need for such a system is self-evident, no one has thus far recognized or made the appropriate assemblage or necessary modifications to those building blocks to effectuate such a system. For example, the heart of Applicant's system and associated methods—the coin card—is well known and used in many cash substitute transactions. A particularly relevant example is that of France's "TELECARTE" system for use with public phones. Users of public phones in France must purchase coin cards in order to use the phones—in most cases the phones simply do not accept cash. Each telephone coin card is encoded with data representative of a particular monetary equivalent according to a standard data protocol. Vendors of the cards pay a discounted rate to the French telephone company for each card, and generate profit from the sale of the cards, at face value, to public phone users.

Each phone includes a coin card reader/writer which first reads the card's initial value to establish available credit for the user's phone call and, upon completion (or termination) of the call, to record data into the card's memory reflective of a lower (or exhausted) card value.

Other known uses of coin cards as cash substitutes are associated with photocopy machines at universities and with prison commissary systems. All such uses, however, are in the context of "closed systems". In other words, the issuer of the card is also the exclusive vendor of the goods or services to be purchased with the cards. Lacking any universality in the marketplace, coin cards purchased for use in such closed systems merely augment the cash and cash substitutes carried by their users for other transactions. A user of one of these closed system cards will still tender, and will inevitably receive many coins as part of cash transactions outside of the closed system. Examples of closed systems include Pusic, U.S. Pat. No. 4,900,906, Ushikobo, U.S. Pat. No. 4,879,540, and Capers, U.S. Pat. No. 4,669,596. None of these patents discloses a plurality of coin card reader/writers and a clearing center processor. These features are essential to a system that permits universal acceptance of a single coin card by multiple vendors. Without these features, coin cards have limited consumer appeal because a consumer who desires to be rid of the problems associated with coins discussed above will have to carry a wallet full of coin cards for each closed system from which he makes purchases.

In sharp contrast, by providing for a clearing center processor and a plurality of coin card reader/writers, the present invention permits the consumer to carry just a single coin card which will be accepted by multiple vendors and vending machines. With the system of the present invention, a practical, universally accepted alternative to coin transactions is disclosed.

It is the concept of great numbers of proprietors from every facet of commerce, each With a reader/writer and transaction register units configured for use in Applicant's transaction system and linkable with a central clearing center for payment processing, which lies at the heart of Applicant's invention. By affording universal acceptance of pre-paid coin cards for purchase transactions as made possible by this concept, it will be realistically possible to eliminate coin usage from consumer's day-to-day transactions.

Some have proposed apparatuses which seem to be directed to more universal use of coin cards in consumer transactions (see U.S. Pat. No. 4,877,947 issued to Mori, for example). Such systems do not, however, provide or suggest system or method components which permit an actual system of transaction processing to be feasible. For example, Mori proposes a machine which debits a user's coin card and credits a proprietors coin card, generally suggesting that his machine will make coin cards more universally applicable to purchase transactions.

Mori suggests taking the proprietors' coin card to banks, etc. for processing. Mori falls well short of providing the complete system by which consumers will come to have coin cards with value which is transferrable to proprietors which, in turn, is transferrable (either directly or through intermediaries) to services who hold funds initially paid for the cards in exchange for actual monetary compensation. Also, the apparatus and methods suggested by Mori present an inconvenience factor (having to physically take or send coin cards to payment processing services) which likely will render the system, even if integrated in a workable transaction system, not sufficiently attractive to proprietors to generate wide-spread use. Just the time delay alone in this step will deprive proprietors of funds for times which cumulatively deny the proprietor use-of-funds to a significant degree. Furthermore, relying, as Mori's system does, generating and having to transfer a physical object representing intrinsic value from one location to another presents security concerns.

Although present day credit cards and automated teller machine cards involve systems that are not closed, systems employing these techniques have the drawback of requiring "on line" capability. In other words, credit card systems and ATM machines must verify, at the time of the transaction, that the card holder has sufficient purchasing power to complete the transaction. Aside from requiring a time consuming electronic verification, these on-line systems require that a telephonic link with the central processing center to be constantly maintained. If a power outage or any other problem with the communications system is encountered, on-line transactions cannot operate.

The present invention, on the other hand, does not require an external communication with the central processing center for each sales transaction because the coin card represent actual and available purchasing power. There is no need to verify funds with a third party institution as is required for transactions involving credit cards or ATM cards.

Instead, the present invention provides for information transfer requires only that the transaction information stored on each coin card reader be electronically transferred to the central processing center periodically, at the end of each business day, for example. By not requiring fund verification at the time of the transaction, an off line system, such as the present invention is immune from potential problems with the communication hardware and with the central processing system's hardware. If, for example, a telephone wire is down for several hours, consumers and vendors can continue to make coin free transactions using the present invention. Only at the end of the day, when the vendor desires to transfer the days transaction information to the central processing center is a communication link required.

The entire system can be most easily understood by following the path of money through the system. A card issuer will sell coin cards, encoded for certain indicated face values, to distributors (grocery stores, banks, convenience stores, post offices, etc.) for a discounted price. The card issuer places the proceeds from initial card sales in interest bearing accounts. It is possible that market realities may dictate that some cards are placed with distributors on a consignment basis, rather than a pre-paid basis, but this is obviously a far less attractive alternative to card issuers.

Card distributors will sell the coin cards to consumers at face value thereby deriving the profit necessary to motivate their participation.

When purchasing goods and services from vendors who have system reader/writer and transaction register units, consumers will present their coin cards either (1) completely in lieu of cash; (2) to pay portions of transactions for which they lack adequate cash; or (3) to supplement their cash by an amount which covers other than even-dollar portion of their transaction total or which generates only even-dollar change. Two examples of this third option are instructive:

EXAMPLE 1

Purchase transaction total is $4.75.

Customer has a $4.00 in cash.

Customer instructs sales clerk to debit card for $0.75.

Customer receives no change.

EXAMPLE 2

Purchase transaction total is $4.75.

Customer has a $5.00 bill.

Customer instructs sales clerk to debit card for $0.75 and take $4.00 from the $5.00 bill.

Customer receives a $1.00 bill as change.

It should be noted that cash registers, such as the NCR model 7058, 80286 based cash register, are easily configured to query the operator for the amount by which the coin card detected in the reader/writer should be decremented, as well as the amount of cash tendered by the customer to, in one step, made the necessary debit amounts to the coin card and display the amount of change, if any, to be returned to the customer.

SUMMARY OF THE INVENTION

It is an object of the present invention to provide a novel transaction processing system for obviating the need for coins in consumer purchase transactions.

It is an object of the present invention to provide a novel transaction processing system for obviating the need for coins in consumer purchase transactions by providing for the exchange and manipulation of data representative of monetary equivalents among debit-only coin cards, vendor transaction registers, and clearing center processors.

It is an object of the present invention to provide a novel transaction processing system for obviating the need for coins in consumer purchase transactions without necessitating the use of telephonic data transmission/reception coincident with the purchase transaction.

It is an object of the present invention to provide a novel transaction processing system involving debit/credit exchanges between coin cards used by consumers and transaction registers used by vendors, with vendors receiving actual monetary credit for goods and services provided to coin card users upon "dumping" data representative of cumulative coin card purchase transactions from transaction registers to clearing center processors of clearing center service providers.

In satisfaction of these and related objectives, Applicant's present invention provides a novel, cash alternative transaction processing system and associated method for use in consumer purchase transactions based, in part, on the use of coin cards. Applicant's system includes, at a minimum, four primary components: (1) one or more coin cards having restrictively modifiable data representative of a monetary equivalent recorded in its on-board memory; (2) card reader/writers which can access and modify the data stored on the coin card in a manner solely to reflect lower monetary equivalents than reflected by such data prior to a transaction in a "debit/credit exchange"; (3) a transaction register interfaced with the card reader/writing into which each purchase transaction amount is entered and which both provides the imput to the card reader/writer necessary to debit the coin card and stores the cumulative data representative of the collective coin card transactions undertaken by a vendor with multiple customers using coin cards; and (4) a clearing center processor into which monetary equivalence data from one or more transaction registers (or data collection database) is periodically "dumped", from which data payments to vendors, representative of the amount of goods or services conveyed to consumers in exchange for debit of their coin cards, are processed by clearing center service providers.

All uses of the term "dump" in this application mean to interface a delivering device (such as a transaction register) with a receiving device (such as a clearing center processor) whereby delivering device data representative of a monetary equivalent and initially stored in the memory of the delivering device is modified to represent the monetary equivalent of $0.00 immediately after the monetary equivalence of data stored in the receiving device is modified to reflect a monetary equivalence of a sum initially reflected by such data increased by the amount by which the monetary equivalent of the delivering device's data is reduced. "Debit/credit exchange" has a substantially similar meaning to "dump", with the exception that the result of the transaction is that data of the delivering device (such as a consumer's coin card) is not necessarily modified to represent the monetary equivalent of $0.00, but rather reduced by a transaction amount (such as the purchase price of goods/services purchased by a consumer as part of one transaction, up to the remaining balance reflected in the coin card memory) from an higher pre-transaction monetary equivalent to a lower post-transaction monetary equivalent.

Coin cards provide an ideal basis for a truly utilitarian coin substitute system. Coin cards can store and report changeable data representative of monetary equivalent increments. This means that a coin card can represent intrinsic value, as distinguished from present day ATM cards which merely identify accounts which, through on-line, real-time telephonic transactions, can be debited for transactions. Accordingly, the use of coin cards need not involve the expense and time consuming steps of on-line, real-time account debit/credit transactions, dis-incentives which are not justifiably ignored by proprietors for use in small value transactions.

Also, as distinguished from credit cards, the use of coin cards with depletable intrinsic values need not involve the paper work and transactional expense associated with credit cards. Since no credit is extended, no signature or other user authorization is required, the need for multiple charge slip copies is obviated, and no card issuer approval is required. Also, like cash, there exists no possibility of charge-backs arising from unauthorized use of a coin card.

As distinguished from checks and bank drafts, a coin card with an integrally recorded, debit-only balance cannot be used beyond its holder's available balance. Also, data from multiple coin card transactions can be simply aggregated by any computer system into which the data from transaction registers is input. Further still, and there exists in the context of coin card usage no counterpart to endorsing, listing, and related processing of checks.

A cash alternative purchase transaction system such as Applicant proposes, and which is based on using coin cards with integrally recorded, non-enhanceable (or debit-only) balances need not, in order to have substantial utility, be used as a complete substitute for cash. In fact, Applicant's proposed system may possibly best achieve its primary goal—obviating the need for coins in small value consumer transactions—when used in conjunction with paper currency. For example, most consumers acquire their coins during any given day in the form of change in other than even-dollar transactions ($0.67 in coin change from a $4.33 transaction in which the consumer gives the vendor a $5 dollar bill). Applicant's processing system permits consumers to tender both cash and their coin cards in other than even-dollar transactions, with the even-dollar portion of a transaction total to be deducted from the consumer's paper currency, and the fractional dollar portion to be deducted from the balance on the user's coin card. This combined use of paper currency and coin cards obviates the need to give or receive coins, and preserves the useful life of the user's coin card by consistently debiting the card by amounts less than $1.00 increments.

A still further application of Applicant's system in reducing or eliminating the need for coins for most consumers relates to vending machines. Vending machines may be outfitted with coin card reader/writers with an integrated transaction register which records data representative of the cumulative monetary equivalent of all coin card transactions occurring between reporting times. Because telecommunication equipment for each of a number of vending machines is not likely to be economically feasible, data would be collected, not by periodic telephonic linking with a remote clearing center processor such as would be expected for retail environments, but through use of mobile data integrator in the form of specialized collector coin cards or mobile data collectors/aggregators. These aggregating devices fit into, or have components which fit into coin card reader/writer slots and execute software or firmware which instructs the vending machines' transaction registers, via their reader/writers, to "dump" data representative of the machine's coin card transaction totals into the aggregating device's on-board memory. Due to memory limitations of smarts cards, when using them for collecting data from vending machines, it is envisioned that one card would be designated for each vending machine. Portable data collectors, however, could aggregate data from multiple machines, in each case recording not only the transactional data from each machine in a dumping operation, but recording the identity of each machine polled. A logic flow chart depicting the logic to be applied by software or firmware operated by vending machine processors is provided in FIG. 3.

Figure 4:
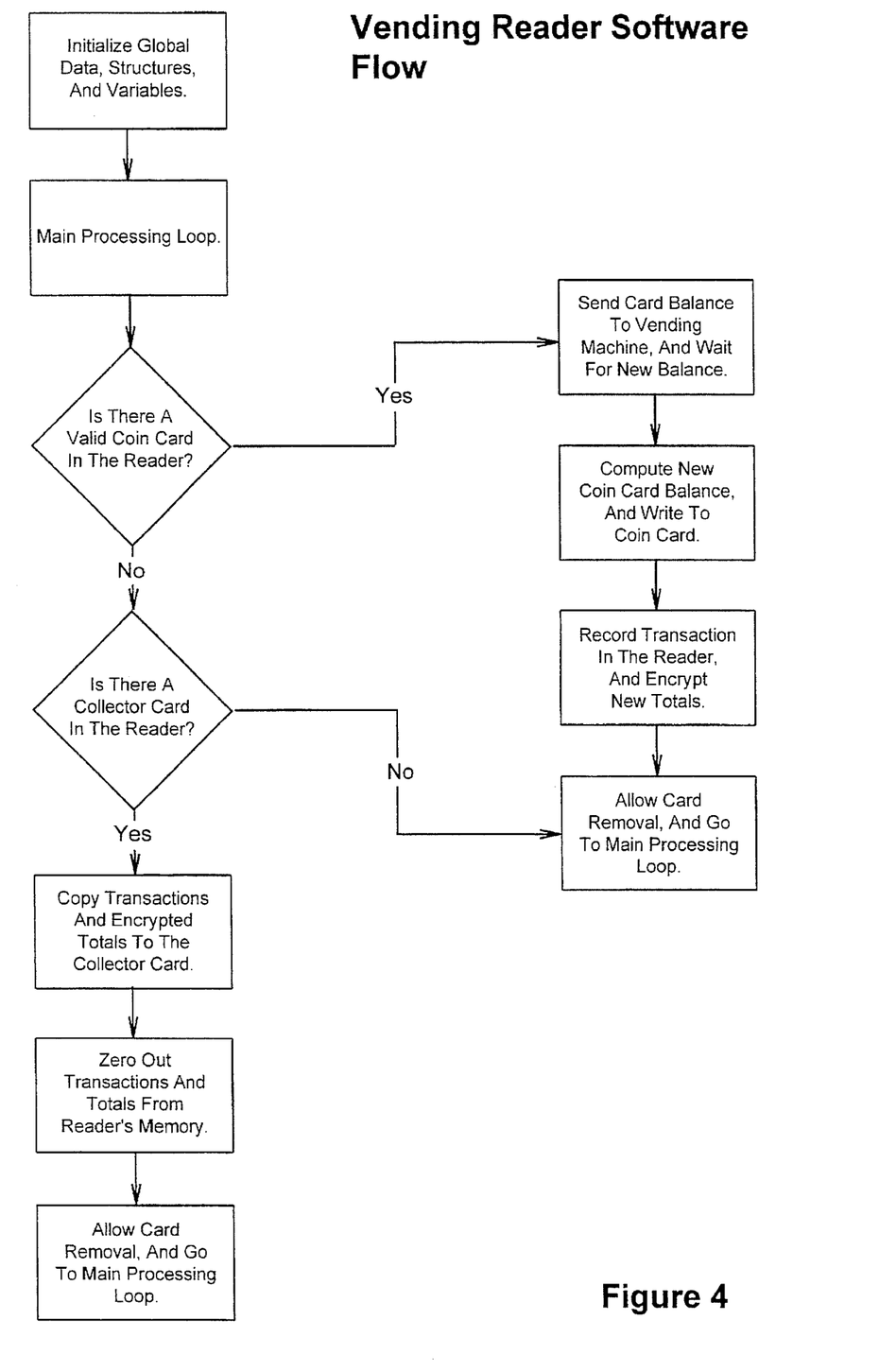
FIG. 4 is a logic flow chart depicting the logic to be applied by software or firmware operated by vending machine processor as intended for inclusion in Applicant's transaction processing system.

Data collected from vending machines by collector cards or data aggregators are then "dumped" into the memory of a "docking station". The docking station is simply a computing device with a coin card reader/writer. The logic of software governing operation of a docking station is provided in FIG. 4. The docking station runs such software (or firmware) which, via a coin card reader/writer, causes the aggregator cards to dump their data into the docking station's memory. The docking station, in turn, can thereafter function much like a transaction register at a retail location and, via telephonic communication linkage, dump its data to a clearing center processor for vendor payment processing.

Figure 5:
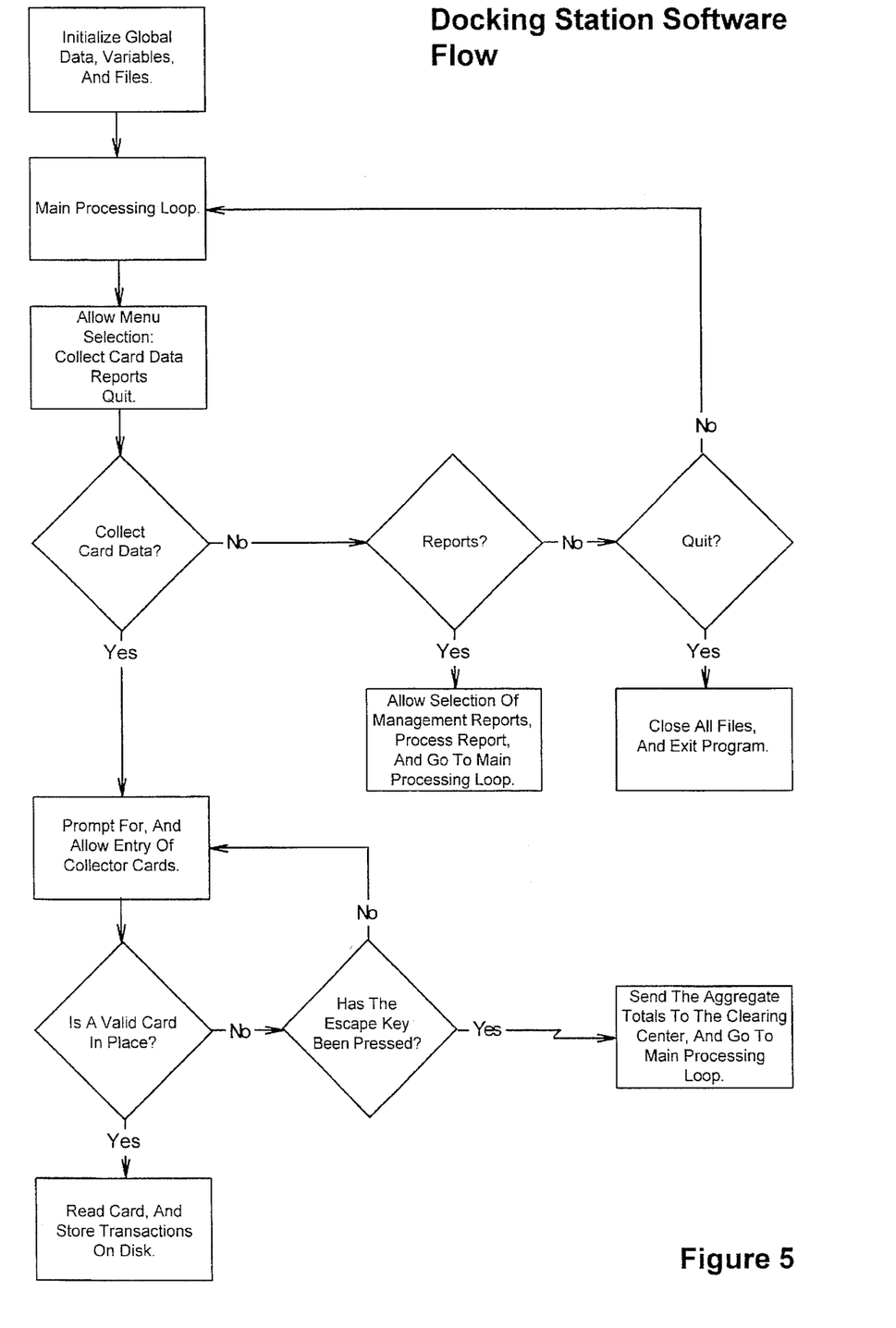
FIG. 5 depicts the logic of software governing operation of a docking station as integrated in Applicant's transaction processing system.
Figure 6:
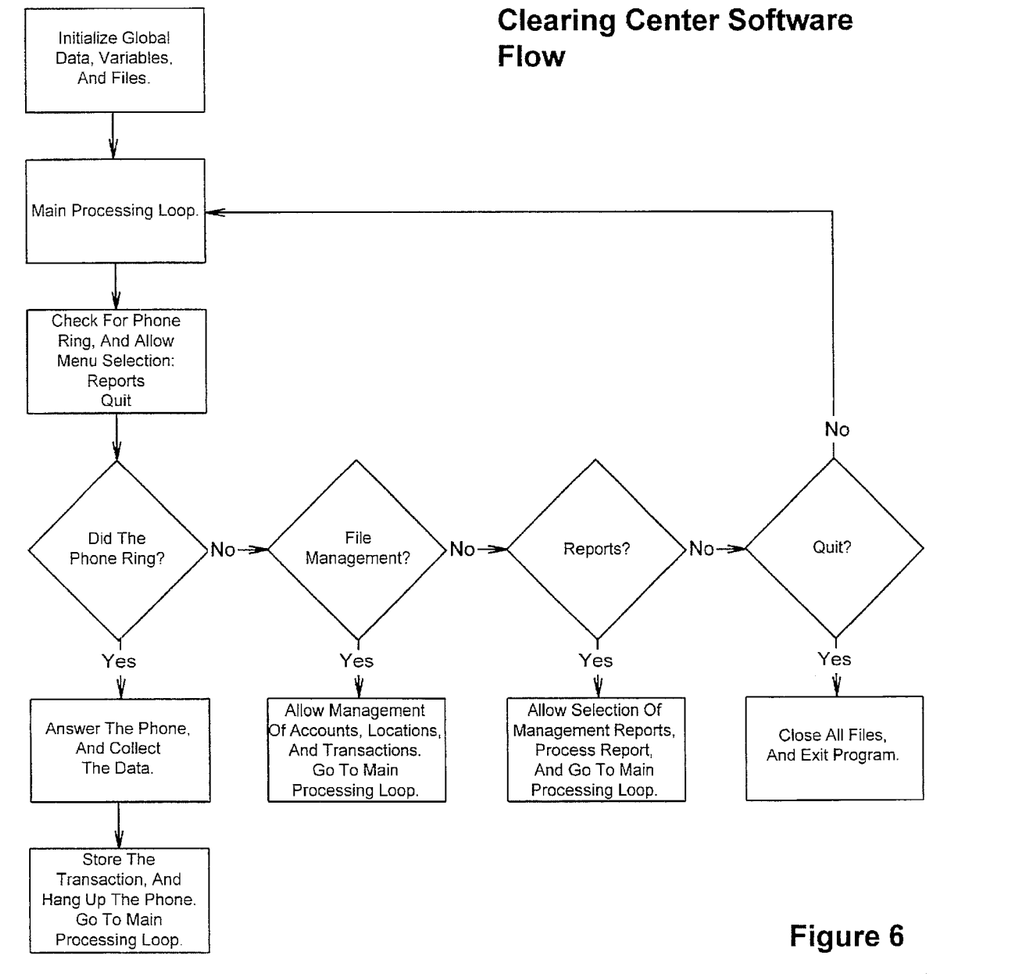
FIG. 6 depicts the logic of software governing operation of a clearing center processor for use in Applicant's transaction processing system.

A clearing center processor will, according to Applicant's invention, be governed by software following logic as depicted in the flow chart of FIG. 5.

DETAILED DESCRIPTION OF THE PREFERRED EMBODIMENT

Figure 1:
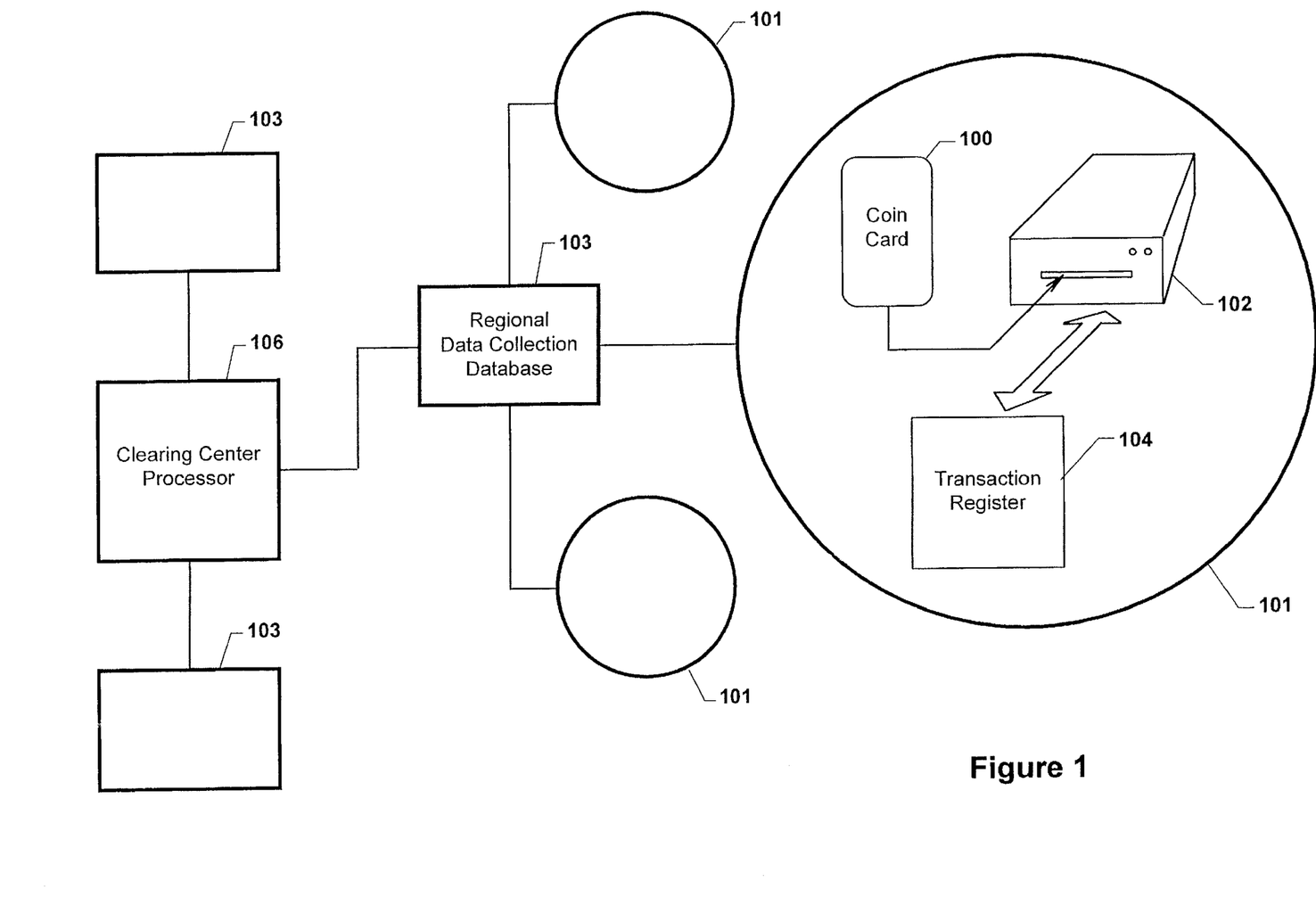
FIG. 1 is a depiction of the major functional components of the present invention.

With reference to FIG. 1, Applicant's purchase transaction system includes, at a minimum, four primary components: (1) one or more coin cards 100 having restrictively modifiable data (prior to modification in transaction—"primary card data") representative of a monetary equivalent recorded in its on-board memory; (2) card reader/writers 102 which can access and modify (to become "secondary card data") the data stored on the coin card solely to reflect "beta values" which are lower in monetary equivalence than values ("alpha values") reflected by coin card data prior to a transaction in a "debit/credit exchange"; (3) transaction registers 104 interfaced with the card reader/writing into which each purchase transaction amount is entered and which both provides the revised, lower card amount ("beta value") data to be recorded into a coin card memory as part of a "debit/credit exchange" and stores the cumulative data representative of the collective coin card transactions undertaken by a vendor with multiple customers using coin cards ("purchase point cumulative data"); and (4) a clearing center processor 106 into which "purchase point cumulative data" from one or more transaction registers (or data aggregation processors) is periodically "dumped", from which data payments to vendors, representative of the amount of goods or services conveyed to consumers in exchange for debit of their coin cards, are processed by clearing center service providers.

In integrating vending machines into Applicant's system, additional intermediary components are involved due to the impracticality of providing each of numerous vending machines with separate data transmission facilities.

In the preferred embodiment, each coin card 100 is a plastic disk in the size and shape of a credit card containing a non-volatile programmable memory device. A commercially available example of such a coin card is the Schlumberger F256 Smart Card. Information about this device is available from Schlumberger Technologies, Smart Cards and Systems Division, 825 B Greenbrier Circle, Chesapeake Va. 23320. In the preferred embodiment a 256 bit PROM is used as the non-volatile memory device with the highest 96 bits reserved for the manufacturer of the coin cards. The lower 160 bits, referred to as the "transaction" bits are divided into 8 categories of 20 bits with the bits in each category representing a particular monetary value. For example, on a $20 coin card, the 20 bits in the highest category represent 50¢ per bit, the 20 bits in the next highest category represent 25¢ per bit, and so on for each category, 10¢, 5¢, 4¢, 3¢, 2¢, and finally the lowest category of 20 bits in which each bit represent 1¢. As each transaction is processed the card reader/writer 102 programs the appropriate bits on the coin card. The bits are programmed in descending order such that the highest currency value bits are programmed first. For example, on an unused $20 coin card, a 75¢ transaction would be recorded by programming one 50¢ bit and one 25¢ bit. A $10.75 transaction would be programmed, on a new card, by blowing all twenty 50¢ bits, and three 25¢ bit. The transaction bits are protected by polysilicon fuses that are destructively ruptured when during bit programming such that each bit is capable of being programmed only once.

In the preferred embodiment, the Schlumberger SCR60 Smart Card Reader/Writer is used as the reader/writer 102. The SCR60 employs a 80C31 CPU, 32K of RAM, 32K of EPROM, and an RS-232 serial port connected to the transaction register 104. The SCR60 is more fully described in the SCR60/SCR65 User's Manual available from Schlumberger Technologies, Smart Cards and Systems Division, 825 B Greenbrier Circle, Chesapeake Va. 23320.

In the retail environment, such as a convenience store, the coin card reader/writer 102 is interfaced with a cash register device (not shown in the figures). Since the card reader/writer 102 is has a RS-232 serial port or other standardized communications interface, a wide variety of recipient devices can be connected to the system. Applicant has, for example, successfully interfaced an NCR model 7058, 80286 based cash register with the Schlumberger SCR60 Smart Card Reader/Writer. Such interfacing techniques are well known in the art.

The reader/writer 102 either has an integral (or separate, but interfaced) transaction register 104 which records data representative of the cumulative value of transactions processed using coin cards.

Figure 2:
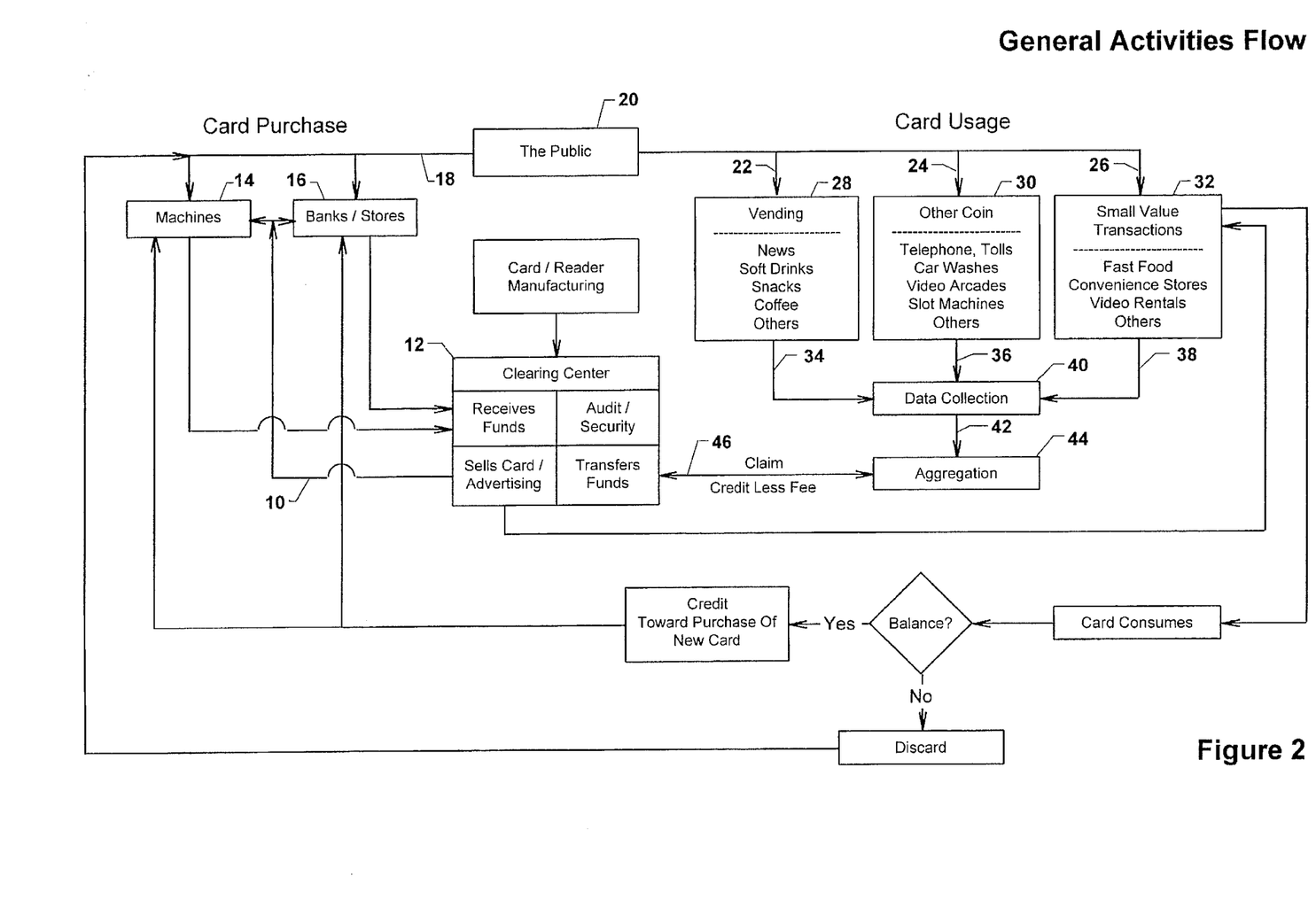
FIG. 2 is a generalized flow chart providing an overview of the sequence of transactions involved in Applicant's proposed transactional system.

The transaction register 104 is a simple interface between the card reader/writer 102 and the recipient device or entity, shown as 28, 30, and 32 on FIG. 2. Any portion of the transaction amount may be paid for by the coin card 100 as long as the card has sufficient value. Typically, however, the consumer will simply wish to use the coin card 100 to pay the change. Thus, in a $9.57 transaction at a convenience store, the consumer would typically hand the clerk a ten dollar bill and insert his coin card into the card reader/writer. The consumer would receive a one dollar bill as change and the value on his card would be reduced by 57¢.

A cumulative register within the transaction register 104 receives the transaction amount. The transaction register's cumulative register is incremented by this amount a from the recipient device and cumulates the transaction information and sends an electronic signal representing the monetary value of the transaction to the reader/writer 102 over the RS-232 serial port. When the reader/writer 102 receives the transaction amount from the transaction register 104, a software routine resident on the reader/writer is initiated that systematically programs available bits on the coin card 100. If the value remaining on the coin card 100 is insufficient to cover the transaction, a message is sent to the transaction register 104.

Referring to FIG. 2, a general overview of the Applicant's transaction processing system is shown in flowchart format. A coin card 100 is introduced into the sequence of physical steps at step 10 by a clearing center 12. The coin card 100 is provided either to a coin card vending machine 14 or at a bank or other retail outlet 16. The coin card is then purchased, in step 18, by a member of the public 20. Member of the public 20 then presents the coin card in either steps 22, 24, or 26 as a cash substitute for a commercial transaction, respectively to a vending machine 28, a coin-operated service provider (telephone, car wash, etc.) 30, or to a retail establishment 32. Each recipient device or entity (28, 30 or 32) has a card reader which, as described above, processes the coin card whereby data on the coin card is altered to represent a lesser monetary equivalent, while data in the recipient entity or device's transaction register 104 is altered to reflect a corresponding increase in monetary equivalent.

In steps 34, 36, or 38 respectively, a data collection 40 is assembled from the coin card debit data collected by recipients 28, 30 and 32. In step 42, the data in data collection(s) 40 are aggregated into an aggregation 44 by a single owner of card recipient(s) for bulk submission to the clearing center 12 in step 46 either for credit toward purchase of new card(s), or for payment by clearing center 12 to the submitter's bank account.

Coin cards which are to be used in Applicant's transaction system are such as are available from the Schlumberger Technologies company in Chesapeake, Va. In short, such coin cards exhibit microprocessors and memory modules into which is stored data which, according to a protocol, represents a monetary equivalent. This data is readable and modifiable by coin card reader/writers which are also available from Schlumberger Technologies.

It is envisioned that, to maximize utility, general public acceptance and use, and system administrator revenue, while minimizing safety concerns (arising from consumers carrying very high value cards) and consumer resistance to up-front advance of funds for transactions, coin cards used in Applicant's system should be coded for initial values not to exceed about $20.00. The circuitry and logic of the coin cards should be, according to existing technology, such that the data representative of the card's monetary equivalent, should be modifiable after initial encoding during the manufacturing process only in a manner which reduces the value from its initial face value to an eventual zero balance.

Figure 3:
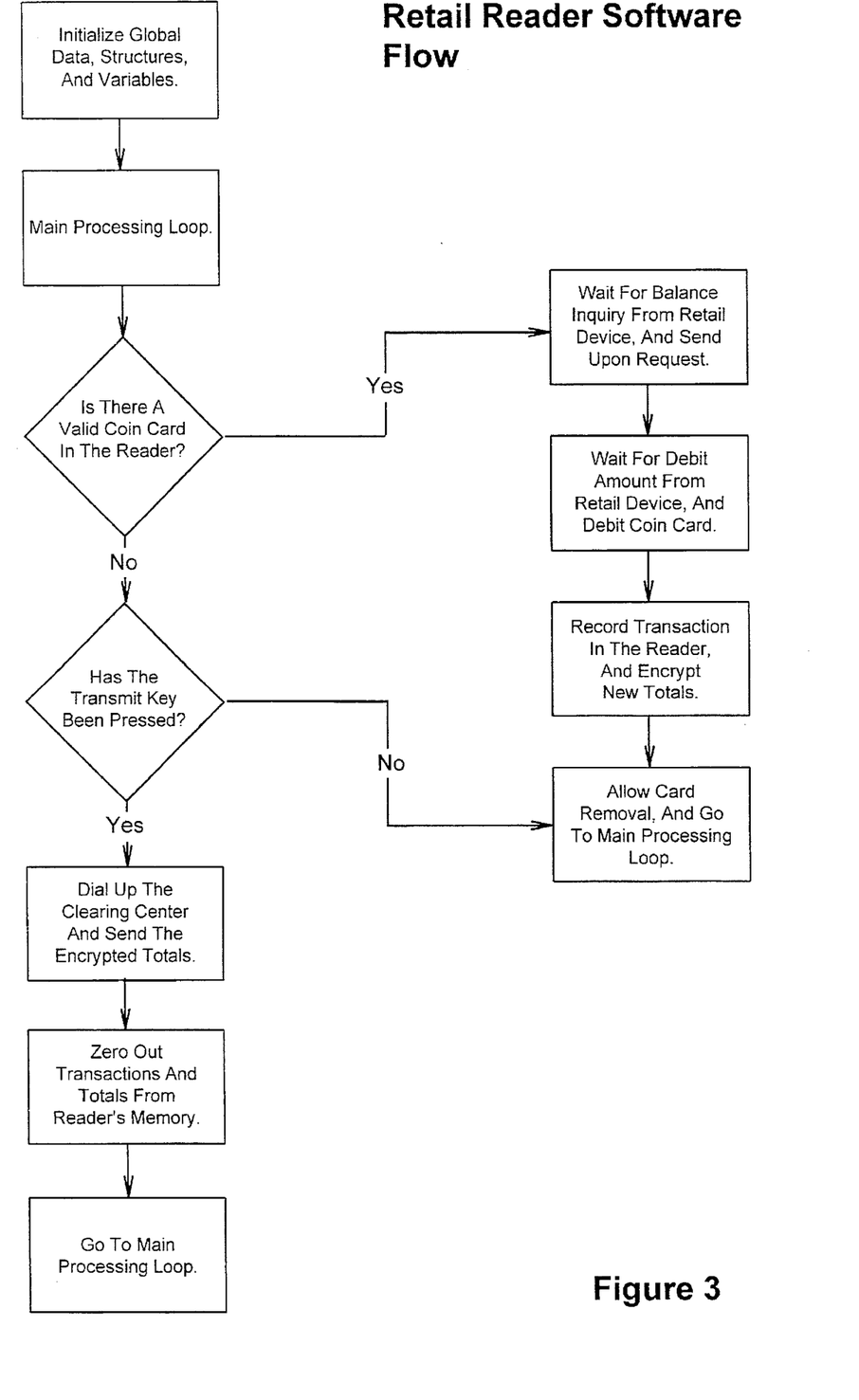
FIG. 3 is a flow chart of the logic of software (or firmware) governing the operation of a vendor's reader/writer and transaction register as an integrated unit.

Depicted in FIG. 3 is a flow chart of the logic governing the operation of a vendor's reader/writer 102 and transaction register 104 as an integrated unit. As generally depicted in the flow chart of FIG. 3, a purchase transaction involves placing a coin card 100 into the reader/writer, the recipient device querying the coin card's available balance as reported by the reader/writer, the cash register providing to the reader/writer the monetary amount by which the coin card's available balance should be debited ("the Debit Amount"), the reader/writer debiting the coin card 100 by the debit amount, and the transaction register 104 incrementing its value by the debit amount as a credit to the cumulative coin card purchase registry (in FIG. 3 the "New Totals").

Another, critical function of the reader/writer 102 and transaction register 104 unit of Applicant's system as depicted in the flow chart of FIG. 3 is "dumping" the transaction register from each recipient device to a data collection database 40 along with information used to identify the recipient. The data in the data collection database will then be sent to a clearing center processor via conventional modem and phone line where the clearing center will pay the appropriate recipients.

Transferring data from the recipient device to the data collection database is accomplished via a modem for those reader/writers that have external communication capability. For remote recipient devices, i.e., devices that have no external communications capability, the information stored in the transaction register 104 must first be collected on a portable collection unit and then physically transferred to the data collection database. In the preferred embodiment of the present invention, the collection of transaction register data from remote locations is accomplished with a collector card of the same shape and dimensions as the coin card 100. When the collector card is inserted into the card reader/writer 102, the reader/writer 102 reads the reserved memory locations of the collector card, identifies it as a collector card, and initiates a transfer of the information stored in the transaction register 104 to the collector card memory along with information used to identify the recipient, and clears the contents of the transaction register 104. In the preferred embodiment, the collector cards are implemented with Schlumberger Smart Card model number EE4K smart cards. Specifications of this device are available from Schlumberger Technologies, Smart Cards and Systems Division, 825 B Greenbrier Circle, Chesapeake Va. 23320. Each collector card has capacity to receive transaction register information from a large number of remote recipient devices.

In the preferred embodiment of the invention, a plurality of region data collection database are interfaced to the clearing center processor via a modem. Periodically, the data from all transaction registers in a given region is transferred, either by phone line for those recipient devices that have external communication capability or by the use of collector cards for the remote recipient devices, to the regional data collection database. Each regional data collection database is, in turn, interfaced to the clearing center processor through a modem and phone line. When it is desired to transfer data from each regional collection to the clearing center processor, a regional data dump is initiated transferring all of the transaction register information to the clearing center processor.

The regional collection databases and the clearing center processor are general purpose computers capable of analyzing and reporting large amount of information. When all of the transaction register data has been transferred to the clearing center processor, the clearing center processor sorts through the transaction information and credits the appropriate vendors either through an electronic fund transfer or through a bank draft or check.

In an alternative embodiment, the regional collection databases can be eliminated if the universe of recipient devices all have external communication capability or if the remote devices are relatively close to each other in proximity. In this embodiment, the transaction register information and of each recipient device and device identification information will be transferred directly to the clearing center processor over the phone lines or through the use of collector cards as described above. Transmission of data from recipient devices to the regional data collection databases can be initiated by actuating a transmit key on the card reader/writer 102.

According to prior arrangements between the vendor and the clearing center, the vendor is then paid an amount reflecting the total amount of coin card transactions, discounted by an amount somewhat analogous to the fees charged to vendors by credit card companies. The proprietor can be paid either by issuing an actual bank draft, or by electronically transferring funds to the vendor's bank account(s).

Much of card issuers' incomes will derive from interest drawn on funds which are held prior to distribution to vendors who accept the coin cards and submit their claims for reimbursement. Issuers may supplement their income by selling the reader/writer and transaction register units to vendors and through advertising revenues from printing promotional graphics on the face(s) of the coin cards themselves.

Because the coin card data which represents a card's monetary equivalent is modifiable (after initial manufacture) such that the value may only be reduced, card's once depleted of value, are simply discarded and consumer's purchase new, replacement cards. This insures a continual flow of profit for all commercial participants in the transaction system which is needed to insure continued participation in the system.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A method for processing transactions comprising the steps of:

interfacing a plurality of coin cards with a plurality of coin cards reader/writer, said coin cards having electronically recorded in coin card memory means primary card data which, according to a protocol and at least until said interfacing, represents a monetary equivalent of an alpha card value, said reader/writer having card data reading means for, upon said interfacing, reading said primary card data, said reader/writer further having card data writing means for replacing said primary card data with secondary card data representing a beta card value, less in monetary equivalence than said alpha card value by a transaction amount difference;

inputting said transaction amount into a purchase transaction register, said purchase transaction register being interfaced with said reader/writer whereby, following said inputting, said card data writing means records said secondary card data into said coin card memory means, said transaction register having register memory means for cumulatively recording purchase point cumulative data representative of a monetary equivalence of the sum of the total of all transaction amounts entered into said transaction register during a recording period, said transaction register further having clearing center interfacing and cumulative data dumping means for interfacing said transaction register with a clearing center processor having clearing center processor memory means for storing said purchase point cumulative data, communicating said purchase point cumulative data to said clearing center processor memory means as clearing center data and thereafter modifying said purchase point cumulative data in said transaction register memory to represent a monetary equivalent of zero monetary units;

at the end of said recording period, actuating said clearing center interfacing and cumulative data dumping means.

2. The method of claim 1 further comprising the step, after said actuating said clearing center interfacing and cumulative data dumping means, of:

converting said clearing center data in said clearing center processor memory means to payment means equal in value to said monetary sum of said total of all transaction amounts entered into said transaction register during said recording period.

3. A method for processing transactions comprising the steps of:

selecting a coin card having recorded into said coin card's electronic memory primary card data which, according to a protocol represents a monetary equivalent of an alpha card value;

identifying goods/services to be purchased by a consumer and ascertaining a total purchase price of such goods/services using goods/services identification and valuation means;

interfacing said coin card with a coin card reader/writer, said reader/writer having card data reading means for, upon said interfacing, reading said primary card data, said reader/writer further having card data writing means for replacing said primary card data with secondary card data representing a beta card value, less in monetary equivalence than said alpha card value by a transaction amount difference;

inputting said total purchase price into a purchase transaction register; inputting a cash amount equal to a sum of cash, if any, to be applied by the customer to the purchase of said goods/services and, using calculating means, calculating said transaction amount which transaction amount represents the difference between said total purchase price and said cash amount;

inputting said transaction amount into said purchase transaction register, said purchase transaction register being interfaced with said reader/writer whereby, following said inputting, said card data writing means records said secondary card data into said coin card memory means, said transaction register having register memory means for cumulatively recording purchase point cumulative data representative of a monetary equivalence of the sum of the total of all transaction amounts entered into said transaction register during a recording period, said transaction register further having clearing center interfacing and cumulative data dumping means for interfacing said transaction register with a clearing center processor having clearing center processor memory means for storing said purchase point cumulative data, communicating said purchase point cumulative data to said clearing center processor memory means as clearing center data and thereafter modifying said purchase point cumulative data in said transaction register memory to represent a monetary equivalent of zero monetary units;

at the end of said recording period, actuating said clearing center interfacing and cumulative data dumping means; and converting said clearing center data in said clearing center processor memory means to payment means equal in value to said monetary sum of said total of all transaction amounts entered into said transaction register during said recording period.

4. A system for processing transactions comprising:

a coin card having electronically recorded in coin card memory means primary card data which, according to a protocol represents a monetary equivalent of an alpha value;

a plurality of coin card reader/writers having card data reading means for, upon interfacing with said coin card, reading said primary card data, said reader/writer further having card data writing means for replacing said primary card data with secondary card data representing a beta card value, less in monetary equivalence than said alpha card value;

a clearing center processor having telephonic interfacing means interfaced to said plurality of reader/writers;

a purchase transaction register interfaced with said reader/writer, said purchase transaction register having purchase amount input means for input of a purchase amount, said purchase transaction register being interfaced with said reader/writer whereby, after said input of said purchase amount, said card data writing means replaces said primary card data with said secondary card data representing said beta card value, less in monetary equivalence than said alpha card value, by said purchase amount, said purchase transaction register further having register memory means for cumulatively recording purchase point cumulative data representative of a monetary equivalent of the sum of the total of all transaction amounts entered into said transaction register during a recording period.

5. The system of claim 4 wherein said purchase transaction register further comprises clearing center telephonic interfacing and cumulative data dumping means for telephonically interfacing said transaction register with said clearing center processor, said clearing center processor having clearing center processor memory means for electronically storing said purchase point cumulative data upon reception from said transaction register, for transmitting said purchase point cumulative data to said clearing center processor memory means as clearing center data, and thereafter modifying said purchase point cumulative data in said transaction register memory to represent a monetary equivalent of zero monetary units.

6. The system of claim 5 further comprising payment processing means, interfaced with said clearing center processor memory means, for deciphering said clearing center data and providing an indicia of said monetary equivalent of at least said total of all transaction amounts entered into said transaction register during said recording period.

7. The system of claim 4 further comprising mobile data collecting means, said mobile data collecting means having a reader/writer interface for interfacing with said reader/writer and for causing said reader/writer to dump said purchase point cumulative data into a mobile data collector memory, said mobile data collecting means further having clearing center dumping means for dumping said purchase point cumulative data from said mobile data collector memory to a clearing center processor memory.

8. The system of claim 7 further comprising a docking station for aggregating data from a plurality of said mobile data collectors, said docking station having clearing center telephonic interfacing and docking station data dumping means for telephonically interfacing said docking station's memory with said clearing center processor, said clearing center processor having clearing center processor memory means for electronically storing said docking station's data upon reception from said docking station, for transmitting said docking station data to said clearing center processor memory means as clearing center data, and thereafter modifying said docking station data in said docking station memory to represent a monetary equivalent of zero monetary units.

* * * * *